Figure 1:
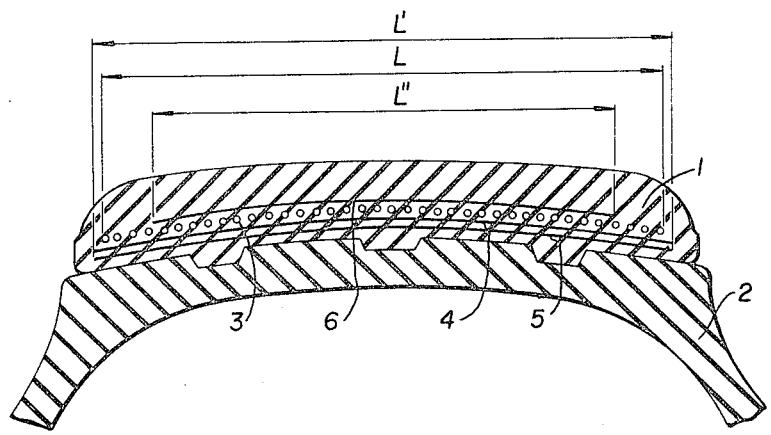

United States Patent
Magistrini et al.

[15] 3,667,527
[45] June 6, 1972

[54] TREAD RING FOR REMOVABLE TREAD TIRES

[72] Inventors: Carlo Magistrini, Monza; Luigi Maiocchi, Milan, both of Italy

[73] Assignee: Industrie Pirelli S.p.A., Milan, Italy

[22] Filed: June 30, 1970

[21] Appl. No.: 51,100

[30] Foreign Application Priority Data

July 29, 1969 Italy................................20215 A/69
Mar. 13, 1970 Italy................................21873 A/70

[52] U.S. Cl..............................152/176, 161/58, 161/144, 152/187
[51] Int. Cl............................................................B60c 11/02
[58] Field of Search.................152/176, 187, 359, 361; 161/47, 78, 58, 144

[56] References Cited

UNITED STATES PATENTS 3,557,858  1/1971  Lugli.....................................152/361
3,503,432  3/1970  Maiocchi..............................152/176
1,689,119  10/1928  Evans...................................152/359

FOREIGN PATENTS OR APPLICATIONS 1,395,033  3/1965  France..................................152/361

Primary Examiner—Arthur L. La Point
Attorney—Stevens, Davis, Miller & Mosher

[57] ABSTRACT

A separable tread ring for pneumatic tires which embodies an armor longitudinally resistant to tension, the armor being formed by a helically wound metal cord, the coils of which are disposed generally parallel to the mid-circumferential plane of the tire. Two additional layers of metal cords parallel to each other in each layer are provided, the cords being disposed in two directions crossed relative to the mid-circumferential plane at angles ranging from 10° to 65°. The latter layers are disposed radially inwardly relative to the armor. A third layer of extensible metal cords is positioned radially outwardly of the armor, the cords of such layer being inclined with respect to the mid-circumferential plane at an angle ranging between 10° and 65°.

8 Claims, 2 Drawing Figures

PATENTED JUN 6 1972　　　　　　　　　　　　　3,667,527

INVENTORS
CARLO MAGISTRINI
LUIGI MAIOCCHI

BY Stevens, Davis, Miller & Mosher

ATTORNEYS

TREAD RING FOR REMOVABLE TREAD TIRES

The present invention concerns removable tread tires; namely, pneumatic tires in which the anchorage of the tread to the carcass is obtained by means of the friction forces produced by inflation of the tire.

The related prior art, including several patents of the applicant, discloses that the tread ring is provided with an assembly of reinforcing structures, whose arrangement has a critical influence on tire performance, in particular in respect to road holding, steering safety and travelling comfort. More particularly, the tread ring comprises a tension-resistant armor, constituted by a single metal cord, helically wound whose coils are disposed in a direction substantially parallel to the mid-circumferential plane of the tire. The armor serves to withstand the carcass expansion, in order to produce the friction forces which provide the anchorage of the tread ring on the carcass.

However, the armor is not sufficient by itself to impart to the tire the many features required for good performance during use.

It is known that, in the tire field, the problems of a complex reinforcing structure are generally solved by the adoption of an assembly formed by three layers, the respective elements of which are disposed along different directions in the various layers. It was found that, by providing two strips of metallic fabric in a radially outermost position with respect to the above indicated armor, and by arranging them so that their cords are symmetrically inclined with respect to the mid-circumferential plane of the tire, it is possible to distribute over a wide portion of the tread stresses caused by a small obstacle, and moreover to improve the transversal or torsional rigidity of the tread ring, affecting in a positive manner the drift characteristics of the tire and its road holding ability.

However, it was also found that the above described reinforcing assembly does not completely solve other needs, which are necessary for good tire performance, for instance, in particularly difficult conditions, as on bad ground. Actually, in such an assembly, the helical winding can be protected towards the tire outside, but is not sufficiently protected towards the tire inside. Especially because of the impacts of the tread against possible obstacles, the reinforcing assembly reacts at the impact point, taking — although temporarily — a convexity directed towards the tire inside, with a consequent thinning out of the coils forming the armor in the concerned zone. This results in damage to the rubber layer underlying the armor and, in the course of time, a weakening of the helically wound cord. Consequently, besides the disruption of the armor of the tread ring, the cord pieces damage the carcass, thus reducing the service life of the tire.

Attempts were made to prevent the above indicated disadvantages by placing one of the two strips of metal cords superimposed to the armor below the latter. In this way the reinforcing assembly shows the two strips having their cords symmetrically inclined with respect to the mid-circumferential direction to maintain the good characteristics of transversal rigidity and of drift of the tire, while the existence of the strip below the armor ensures its integrity even in serious service conditions.

Also, this structure, however, does not constitute the complete solution of all the problems involved in obtaining good performance of the tire. In fact, even if it represents a good level compromise, it involves a deleterious effect on the transversal or torsional resistance of the tread ring, in particular when the tire has to run on bad ground.

Obviously, a reinforcing assembly made of three layers, substantially constituted by an armor whose coils are parallel to the mid-circumferential direction of the tire and by two strips of cord fabric whose cords are symmetrically inclined, can be prepared according to a third arrangement; namely, by disposing both of said strips below the armor.

However, tests carried out by the applicant in this respect did not lead to such results as to permit an evaluation of the validity and of the advantages of this solution in comparison with the others, since it was noted that the reinforcing assembly so prepared involves an inadmissible sensitivity of the tire to the so-called "ridge effect". This latter expression means the difficulty of mastering the vehicle when, in exceptional driving conditions, it travels with its near-side wheels on the road edge, where there is a difference in height between the verge and the asphalt paved road. In such conditions the tire shows a tendency to come down to the verge and to go forward on the road in a difficult to control manner.

The applicant unexpectedly found a reinforcing assembly by means of which it is possible to obtain a tread ring for removable tread tires which gives the tire a service performance to well satisfy the above indicated requirements.

Briefly summarized, the present invention is a tread ring for pneumatic tires separable from the carcass, which comprises an armor resistant to tension in a longitudinal direction, formed by a helically wound metal cord, whose coils are disposed in a direction substantially parallel to the mid-circumferential plane of the tire, and has two additional layers of metal cords, parallel to one another in each layer and disposed along two directions crossed with respect to said mid-circumferential plane and forming with the latter angles ranging from 10° to 65°, and which is characterized in that the additional layers are each disposed in a radially innermost position with respect to the armor, and in that said tread ring has a third additional layer of extensible metal cords disposed in a radially outermost position with respect to said armor and inclined with respect to the mid-circumferential plane of the tire at an angle ranging between 10° and 65°.

The expression "extensible metal cords" means in the present specification those cords which, when they are rubberized, possess an apparent modulus of elasticity, for loads smaller than one-tenth of the ultimate tensile stress, not higher than 3,500 Kg/mm².

The metal cords constituting the third additional layer, external to the armor, may be extensible because of their particular structure. Cords of this kind are, for example, those whose elements are all twisted in the same direction and there is not a central core, namely, the twisting sense of the strands is the same as that of the cord. According to a preferred embodiment, the cords constituting the three additional layers are inclined, with respect to the mid-circumferential plane of the tire, at an angle ranging from 10° to 30°. This embodiment adds to the tire life, and is therefore intended in particular for those cases in which the main problem is tire mileage.

In a further preferred embodiment of the invention, the external additional layer is disposed so that its cords are inclined, with respect to the mid-circumferential plane of the tire, in the same direction as the cords of the internal additional layer closer to the armor.

The width of the additional layers, internal to the armor, must be at least equal to the width of the armor. However, the external additional layer may have a width less than 40 percent of the width of the armor.

It has been ascertained that the presence of a third additional layer disposed externally to the armor has a determinant influence on the behavior of the tread ring, cooperating in an efficient manner with the other layers forming the above described reinforcing assembly. In fact, a pneumatic tire provided with such a tread ring has excellent characteristics of driving safety, road holding and travelling comfort, without affecting the desired tire performance.

Figure 2:
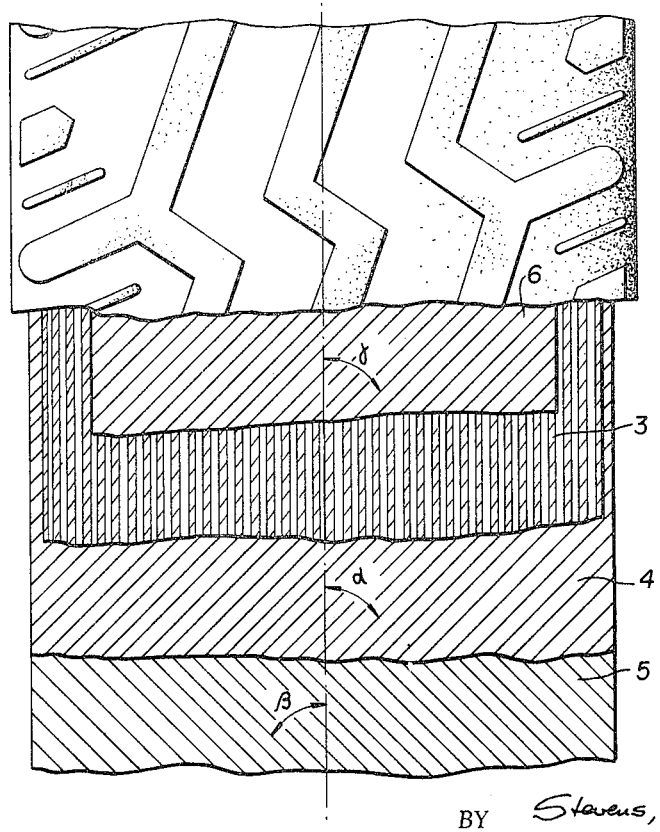

The present invention may now be better understood by reference to the accompanying drawings, given by way of non-limiting example, in which:

FIG. 1 represents partially and in section a pneumatic tire according to the present invention; and FIG. 2 represents, in plane development, the tread ring of FIG. 1, with parts broken away to show the arrangement of the cords inside the tread.

FIG. 1 represents a 12.00 R 20 size removable tread tire consisting of a tread ring 1 and of a carrying casing 2. The tread ring 1 is inwardly provided with an armor 3, constituted by a helically wound metal cord forming a single layer, the coils of said cord being disposed (see FIG. 2) in a direction substantially parallel to the mid-circumferential plane. The used cord can have a 7(7×3)/0.15 structure and a diameter of 2.70 mm, the expression 7(7×3)/0.15 meaning in this case a cord formed by the union of seven cords, each formed by seven strands of three wires each. Each wire has a diameter of 0.15 mm.

The armor has a width L equal to 205 mm. Two additional layers 4 and 5 are disposed in a radially innermost position with respect to the armor. These layers are both formed by metal cords parallel to one another, and symmetrically inclined, with respect to the mid-circumferential plane, by angles $\alpha$ and $\beta$, respectively, having a value of 20°. The additional layers have a width L' of 210 mm; namely, a width slightly exceeding that of armor 3.

A further additional layer 6, also formed by metal cords parallel to one another, is provided in a radially outermost position with respect to armor 3. This layer is also formed by metal cords parallel to one another, which form with respect to the longitudinal direction an angle $\gamma$ equal to 20°, having the same sign as the angle $\alpha$. The additional layer 6 has a width L" corresponding to about 80 percent of the width L of the armor 3, and corresponding therefore to 165 mm.

The cords of the additional layers 4 and 5 have a 7×3/0.15 structure and a diameter of 0.90 mm, the expression 7×3/0.15 meaning in this case a cord formed by seven strands of three wires each; each wire has a diameter of 0.15 mm. The cords of the layer 6 have a 3×7/0.175 structure (three strands of seven wires each) and are formed, as previously stated, by adopting the same twisting sense both for the seven elements and for the cord. Their diameter is 1.10 mm. These cords have an apparent modulus of elasticity, for loads smaller than one-tenth of the ultimate tensile stress, equal to 2,200 Kg/mm².

It should be understood that the above described embodiment is of a non-limiting character, and that the present invention includes any alternative embodiment deriving from the inventive concept involved.

What is claimed as new is:

1. A tread ring for a pneumatic tire of the type in which the tread is separate from the carcass, which comprises an armor resistant to tension in a longitudinal direction, formed by a helically wound metal cord whose coils are disposed in a direction substantially parallel to the mid-circumferential plane of the tire and moreover comprises two additional layers of metal cords parallel to one another in each layer and disposed along two directions crossed with respect to said mid-circumferential plane, and forming with the latter angles ranging from 10° to 65° and is characterized in that said two additional layers are both disposed in a radially innermost position with respect to said armor, and in that said tread ring comprises a third additional layer of extensible metal cords, disposed in a radially outermost position with respect to said armor and inclined with respect to the mid-circumferential plane of the tire at an angle ranging between 10° and 65°, the cords of said third layer being extensible relative to the other mentioned cords in that said third layer cords have an apparent modulus of elasticity not exceeding 3,500 Kg per mm² at loads smaller than one-tenth of the cord ultimate stress.

2. A tread ring as in claim 1, characterized in that the cords of the additional layers are inclined, with respect to the mid-circumferential plane of the tire, at an angle ranging between 10° and 30°.

3. A tread ring as in claim 1, characterized in that the additional layer external to the armor has a width not greater than the width of said armor itself, but not less than 40 percent the width of the armor.

4. A tread ring as in claim 3, characterized in that the additional layer external to the armor is constituted by metal cords whose elements have the same twisting direction.

5. A tread ring as in claim 1, characterized in that the angle of inclination of the cords of the additional layer external to the armor is of the same sign as the angle of inclination of the cords of the inner additional layer closer to the armor.

6. A separable tread ring for pneumatic tires embodying an armor longitudinally resistant to tension, at least two layers of metal cords disposed parallel to each other in each layer and crossed in opposite directions relative to the mid-circumferential plane of the tire at angles ranging between 10° and 65°, said last named layers being positioned radially inwardly of said armor, and an additional layer of metal cords disposed radially outwardly of said armor, the cords of said last recited layer being inclined at an angle ranging between 10° and 65° with respect to said mid-circumferential plane, the last recited cords being extensible relative to the cords of said two layers in that they have an apparent modulus of elasticity not exceeding 3,500 Kg per mm² at loads smaller than one-tenth of the cord ultimate stress.

7. The tread ring defined by claim 6, said armor being formed by metal cords, the coils of which are disposed generally parallel to the mid-circumferential plane of the tire.

8. The tread ring of claim 1, said third layer cords having a considerably greater extensibility than the other mentioned cords by virtue of their being formed of wires wound in the same direction and without the presence of a central core element within the wound wires.

* * * * *